United States Patent
Kienzler

(10) Patent No.: US 6,746,058 B2
(45) Date of Patent: Jun. 8, 2004

(54) SPRING-LOADED AND LOCKING PIN PRESS

(75) Inventor: Rudolf Kienzler, Furtwangen (DE)

(73) Assignee: Otto Ganter GmbH & Co. KG Normteilefabrik, Furtwangen (DE)

( * ) Notice: Subject to any disclaimer, the term of this patent is extended or adjusted under 35 U.S.C. 154(b) by 0 days.

(21) Appl. No.: 10/087,352

(22) Filed: Mar. 1, 2002

(65) Prior Publication Data

US 2002/0159860 A1 Oct. 31, 2002

(30) Foreign Application Priority Data

Mar. 2, 2001 (DE) ......................................... 101 10 201

(51) Int. Cl.$^7$ ................................................. E05C 1/10
(52) U.S. Cl. ............................... 292/175; 292/DIG. 37; 411/347; 403/325
(58) Field of Search .................. 411/351, 352, 411/552, 356, 347, 348; 403/322.1, 325, 327; 292/61, 62, 175, DIG. 37; 248/408

(56) References Cited

U.S. PATENT DOCUMENTS

| | | | | |
|---|---|---|---|---|
| 1,394,513 A | * | 10/1921 | Albonesi | 292/60 |
| 1,789,889 A | * | 1/1931 | Yaggy | 16/404 |
| 3,397,000 A | * | 8/1968 | Nakanishi | 292/61 |
| 4,113,221 A | * | 9/1978 | Wehner, deceased | 248/408 |
| 4,819,309 A | * | 4/1989 | Behymer | 24/586.11 |
| 5,243,921 A | * | 9/1993 | Kruse et al. | 108/147 |
| 5,370,488 A | * | 12/1994 | Sykes | 411/551 |
| 5,586,852 A | | 12/1996 | Ganter | |

FOREIGN PATENT DOCUMENTS

| DE | 93 19 800.0 | 8/1994 |
|---|---|---|
| DE | 297 23 892 U1 | 7/1999 |

OTHER PUBLICATIONS

"Krahn/Northemann/Stenger; Konstruktions–elemente", Vogel–Fachburch, Wurzburg 1, Aufl., 1990, S180.

* cited by examiner

Primary Examiner—Flemming Saether
Assistant Examiner—Jori Schiffman
(74) Attorney, Agent, or Firm—Baker & Daniels

(57) ABSTRACT

A spring-loaded, locking press pin assembly with a pin which extends axially through a guide sleeve and is connected at its upper end with a button, whereby a covered locking device is formed between the button and the guide sleeve. The locking device includes a ring recess, which is located in the button and is downwardly open in the axial direction, into which the guide sleeve engages in a spring-loaded manner with at least two locking teeth, opposite to each other and forming an axial slot between each other. The retainer area for the pressure spring is located in a downwardly open borehole in the guide sleeve and this borehole is located in an axial direction below the locking device.

2 Claims, 1 Drawing Sheet

SPRING-LOADED AND LOCKING PIN PRESS

The invention relates to a spring-loaded, locking press pin.

Such a press pin is for example known from patent DE 93 19 800 U1, assigned to the assignee of the present application.

The press pin shown there has the advantage that it exhibits a lock on the inside between the guide sleeve and the spindle-shaped button. This button can be rotated and moved and is spring-loaded on the guide sleeve. Such covered locking devices have the advantage that they are insensitive to external dirt. The retainer area is arranged radially outward of the shown covered locking device, between the spindle-shaped button and the guide sleeve, extending in the axial direction. This however results in the disadvantage that the outside diameter of the press pin becomes very large, because the locking device and the spring arrangement are arranged in a radial successive configuration.

The task of the invention is therefore to further improve a press pin of the kind initially specified so that it has a small outside diameter while preserving the advantages of a covered locking device.

SUMMARY OF THE INVENTION

The advantages according to the invention arise as a result of the combination of the three features indicated in the characteristics. The first feature describes the covered locking device, which has the advantage that a ring recess is provided in the spindle-shaped button, which is at least partly open downwards in axial direction, resulting in particularly easy assembly possibilities.

The second feature of the invention has likewise the purpose of easy assembly, because the pressure spring is arranged in a downwards open borehole of the guide sleeve and is only supported at a corresponding shoulder of the retracted pin, with the shoulder having a larger diameter. This thereby simplifies the assembly substantially.

Finally the final feature has the advantage that it describes the axial successive configuration of the covered locking device and the spring arrangement, what altogether results in a smaller outer circumference of the press pin.

The variation from the present state of art with a radial successive configuration of an interior locking device and an external spring arrangement is that the invention arranges these two functional elements either in successive axial direction or underneath each other, so that the axial length of the press pin becomes somewhat longer than the well-known press pin, but the outer circumference of the press pin is substantially decreased.

Therefore besides the smaller outside diameter, an easy assembly is achieved as well.

In a preferred embodiment of the invention the ring recesses are created by two sleeve elements of the spindle-shaped button. These ring recesses are located in the spindle-shaped button and retain the locking teeth of the guide sleeve.

Therefore these ring recess can be placed very close to the outer circumference of the spindle-shaped button, whereby good retaining forces for the locking device result.

The external sleeve element, covering the locking device, can therefore be narrow.

In a further embodiment the internal and external sleeve element are connected to each other in the bottom part of the button by radial connection fins in at least two places opposite each other.

Thus a superior stability of the button, which is usually made of plastic, results, because despite the ring recess being placed close to the outer circumference, an excellent stability of the ring recess for engaging the locking teeth of the guide sleeve is ensured.

The formation of the connection fins in the bottom part of this ring recess closes this ring recess—with the use of two locking teeth—in two places opposite each other through corresponding connection fins, so that the connection fin makes a connection between the external and the internal sleeve element of the button. Thus the two sleeve parts are protected against distortion, the ring recess is altogether mechanically highly stable under load and can tolerate bending moments, even if the button is actuated when it is tilted in an angle to its longitudinal axis towards the engaging guide sleeve.

A further advantage results from the successive configuration of locking device and spring arrangement due to the fact that now large spring-loaded strokes of the press pin are possible because of the separate arrangement of the spring from the locking device.

Thus the axial length of the chamber containing the pressure pin can be very long, results in the advantage that the press pin can exhibit a large stroke, because even with large strokes a stable and distortion protected ring recess is created in the button, due to the formation of connection fins between the external and the internal sleeve element.

A particularly favorable assembly arises as a result of the fact that the pin on the inside exhibits an axial stud, which is equipped with a barb-hook-like mounting profile. This mounting profile engages with barb-hook-like projections into the bore wall of the longitudinal borehole in the button.

For the assembly thereof the button, manufactured usually from plastic, is simply put with its longitudinal borehole on the face of the mounting profile of the pin and hit with the hand, whereby the pin with its mounting profile digs itself into the inner walls of the bore in the button and becomes inseparably connected with the pin. Thus no connection by means of retainer rings is required, as they were required for example in DE93 19800U1.

BRIEF DESCRIPTION OF THE DRAWINGS

The invention is described in more detail, using drawings representing only one embodiment. Further features and advantages of the invention will flow from the drawings and their description.

DETAILED DESCRIPTION

Figure 1:
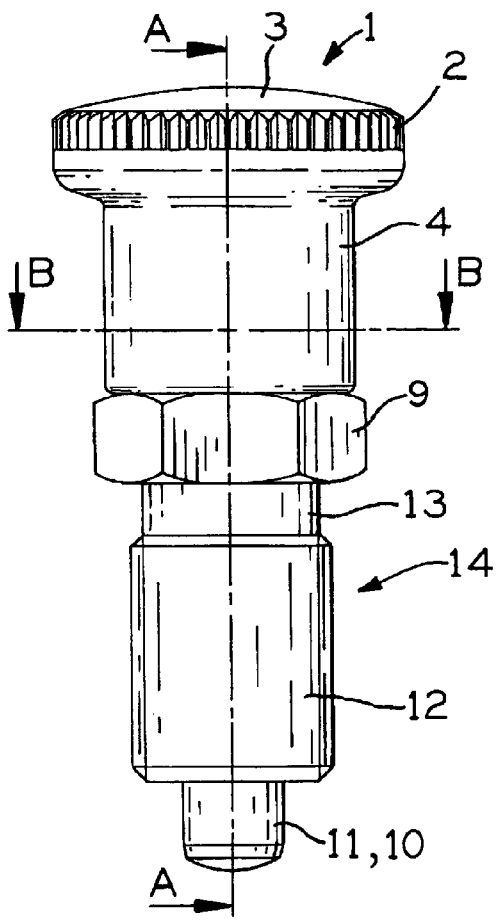
FIG. 1: Side view of the press pin according to the invention.

The spring-loaded press pin according to one form of the invention includes a spindle-shaped button 1, usually made out of plastic, which exhibits at its upper end a thickened top part 3, which has a knurled ring at the outer circumference, in order to facilitate the actuation of button 1 in the axial direction and in the circumferential direction.

The button exhibits in its interior two ring recesses 6 which are opposite to each other and mirror-inverted aligned to each other (see FIG. 3), whereby the wall of each ring recess 6 is formed by a wall of an internal sleeve element 5 and an opposite wall of the external sleeve element 4.

The respective ring recess 6 is opened downwards, whereby the two sleeve elements 4, 5 are connected with each other only in two places opposite to each other (see FIG. 3) in the bottom part 7 of the button 1 by connection fins 8.

The corresponding locking teeth 21, 22, adapted in their shape, engage in the two opposite to each other and about semicircular shaped ring recesses 6. The locking teeth are an extension of the free upper end of a guide sleeve 14.

Figure 2:
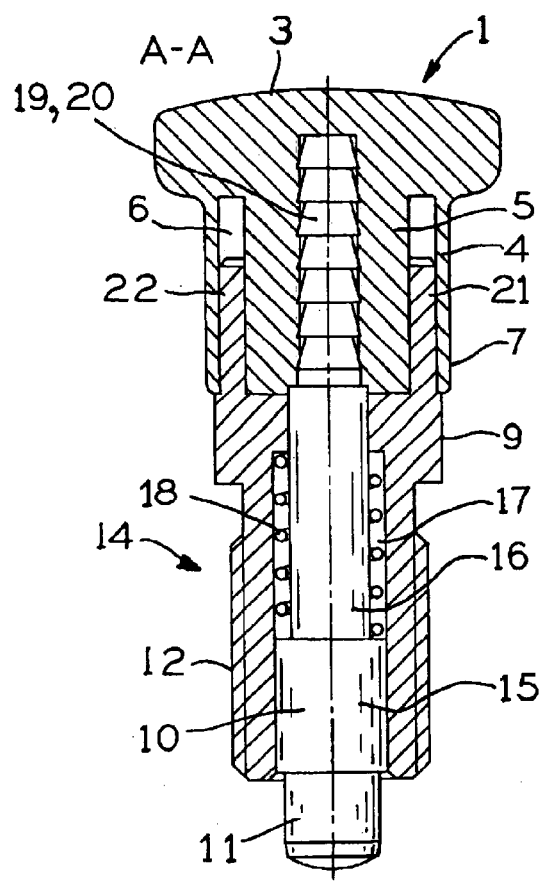
FIG. 2: Cross-sectional view along the line A—A in FIG. 1.
Figure 3:
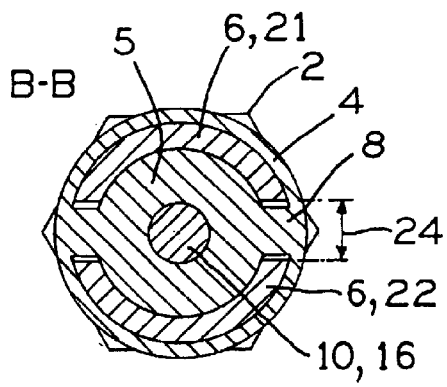
FIG. 3: Cross-sectional view along the line B—B in FIG. 1.

The guide sleeve 14 preferably comprises a metal part with the upward extending portion and opposite facing semicircular shaped locking teeth 21, 22, which fit with little clearance in the circumferential direction in accordance with FIGS. 3 and 2 in the ring recess 6. Here they are axially adjustably mounted.

The locking teeth 21, 22 are separated in the circumferential direction by two mutually opposite and axially extending slots 24. Underneath the connection of the locking teeth 21, 22 to the body of the guide sleeve 14 a key stud 9 is formed at the guide sleeve 14. Underneath follows a shoulder 13 with reduced diameter, which serves as an undercut for the thread 12 therebelow.

Inside the guide sleeve is an internal, axial and unilateral open borehole 17, in which is received pin 10. This pin includes a thrust piece 11 at its lower open end, which disappears into the borehole 17 when the button 1 is pulled up against the force of the pressure spring 18, which is located there.

The spring 18 is supported on one end by an upper, internal shoulder of the borehole 17 and on the other end by a corresponding shoulder of the stud 15 of the pin 10.

A mounting profile 19 with barb-hook-like studs extends from the pin 16, which reaches through the guide sleeve 14.

This mounting profile 19 is thrust into the longitudinal borehole 20 of the button 1 and anchored there.

For the assembly the whole arrangement in accordance with FIG. 2 is therefore put on a surface, so that the thrust piece 11 touches the surface, and the button 1 is put on top of the upward open pin 16 with the mounting profile 19, so that the longitudinal borehole 20 is in contact with the mounting profile 19.

With a quick punch the button 1 is then shifted downwards, so that the mounting profile 19 digs itself into the walls of the longitudinal borehole 20. The button 1 is then inseparably connected with the pin 10.

To create the locked, withdrawn position of the press piece 11 the button 1 is pulled upward against the guide sleeve 14 and against the spring force of the pressure spring 18, so that the locking teeth 21, 22 get outside of engagement with the corresponding ring recesses 6 in the button 1.

The button 1 can be turned in the circumferential direction, so that the upper area of the locking teeth 21, 22 are disposed adjacent to the lower face of the connection fins connection fins 8. Thereby the withdrawn, locked function position of the button 1 is defined.

For the re-establishment of the initial position represented in FIG. 2 the button 1 is turned again against the sleeve element 14, so that the locking teeth 21, 22 become again engaged with the ring recesses 16 and reach through the force of the pressure spring 18 the in FIGS. 2 and 3 represented engagement position.

The advantage of the arrangement is that the borehole 17 can exhibit a relatively large axial length, so that the button 1 can be displaced with a large stroke, whereby it is of course also necessary to adapt the axial length of the ring recesses 6 accordingly.

Despite the large stroke a stable construction of the button 1 arises as a result of the fact that the external and internal sleeve elements 4, 5 are connected through the above-mentioned, opposite to each other connection fins 8.

Drawing Legend

1 Spindle-shaped button
2 Knurled ring
3 Top part
4 External sleeve element
5 Internal sleeve element
6 Ring recess
7 Bottom part
8 Connection fin
9 Keystud
10 Pin
11 Thrust piece
12 Threaded stud
13 Shoulder
14 Guide sleeve
15 Stud
16 Pin
17 Borehole
18 Pressure spring
19 Mounting profile
20 Longitudinal borehole (Button 1)
21 Locking tooth
22 Locking tooth
24 Slot

What is claimed is:

1. A spring-loaded, locking press pin assembly comprising:
   a metal guide sleeve including a borehole having a pressure spring disposed therein, said borehole opening in a first direction, said guide sleeve having a threaded stud portion thereon;
   a metal pin slidably disposed in and extending outwardly from said guide sleeve borehole; and
   a one-piece plastic button including an external sleeve element and an internal sleeve element spaced from said external element to thereby form a ring recess facing in said first direction, said sleeve elements connected to each other on an end portion of said button by means of a pair of radial connection fins, said button including a borehole facing in said first direction;
   said guide sleeve including at least two locking teeth disposed opposite to each other and forming axial slots between each other, said locking teeth slidably received in the ring recess of said button such that said axial slots receive said radial connection fins;
   said pin including a locking profile formed of barbed studs, said locking profile received in said button borehole whereby said barbed studs bite into the button borehole to thereby retain together said button, sleeve and pin;
   said spring being captured in said sleeve borehole between said sleeve and said pin so as to exert an axial mutual separating force on said sleeve and said pin;
   said spring located axially beyond said button ring recess.

2. The press pin assembly according to claim 1, wherein said ring recess includes two recess portions that are mirror-inverted to a center transverse axis and are radially outward from the internal sleeve element and radially inward from the external sleeve element of the button.

* * * * *